United States Patent
Bosch et al.

(10) Patent No.: US 9,761,090 B2
(45) Date of Patent: Sep. 12, 2017

(54) INSTANT BANK ACCOUNT CREDITING VIA A BILL-VALIDATING DEPOSITING SYSTEM

(71) Applicant: Peregrin Technologies, Inc., Portland, OR (US)

(72) Inventors: Samuel H. Bosch, Portland, OR (US); Frank Arthur Roos, Beaverton, OR (US)

(73) Assignee: Peregrin Technologies, Inc., Portland, OR (US)

( * ) Notice: Subject to any disclaimer, the term of this patent is extended or adjusted under 35 U.S.C. 154(b) by 0 days.

(21) Appl. No.: 15/195,219

(22) Filed: Jun. 28, 2016

(65) Prior Publication Data

US 2017/0011599 A1 Jan. 12, 2017

Related U.S. Application Data

(60) Provisional application No. 62/189,666, filed on Jul. 7, 2015.

(51) Int. Cl.
| | |
|---|---|
| *G06Q 40/00* | (2012.01) |
| *G07F 19/00* | (2006.01) |
| *G07F 7/10* | (2006.01) |
| *G06K 19/07* | (2006.01) |

(52) U.S. Cl.
CPC ....... *G07F 19/202* (2013.01); *G06K 19/0723* (2013.01); *G07F 7/10* (2013.01)

(58) Field of Classification Search
USPC .......................................... 235/379; 382/135
See application file for complete search history.

(56) References Cited

U.S. PATENT DOCUMENTS

| | | | |
|---|---|---|---|
| 6,067,530 A * | 5/2000 | Brooks, Jr. .......... | G06Q 20/206 194/206 |
| 8,348,043 B2 * | 1/2013 | Smith ..................... | E05G 1/005 194/350 |
| 8,430,303 B1 * | 4/2013 | Sanders ............. | G06Q 20/1085 235/379 |
| 8,844,804 B2 * | 9/2014 | Blachowicz ........... | G06Q 20/10 235/375 |
| 9,141,876 B1 * | 9/2015 | Jones ....................... | G06K 9/60 |
| 9,396,620 B2 * | 7/2016 | Takayama ............. | G07F 19/202 |

* cited by examiner

*Primary Examiner* — Ahshik Kim
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, using one or more computing devices to facilitate and/or support one or more operations and/or techniques for instant bank account crediting via a bill-validating depositing system, such as a smart safe, for example.

15 Claims, 3 Drawing Sheets

INSTANT BANK ACCOUNT CREDITING VIA A BILL-VALIDATING DEPOSITING SYSTEM

CROSS-REFERENCE TO RELATED APPLICATIONS

This application claims the benefit of and priority to U.S. Provisional Patent Application Ser. No. 62/189,666, entitled "PROCESS FOR PROVIDING INSTANT BANK CREDIT 24/365 INTO AN ACCOUNT FOR CASH DEPOSITED INTO A REMOTE BILL-VALIDATING SMART SAFE," filed on Jul. 7, 2015, which is assigned to the assignee hereof and which is expressly incorporated herein by reference.

BACKGROUND

1. Field

The present disclosure relates generally to finance systems, and more particularly, to instant bank account crediting via a bill-validating depositing system, such as a smart safe, for example.

2. Information

Current provisional credit services, also known as remote cash capture services utilizing bill-validating depositing systems, such as smart safes, for example, may provide provisional credit deposits once a day, typically within twenty-four to ninety-six hours after cash has been deposited into a particular smart safe. At times, these or like provisional credit services may involve a third-party service, such as to affect a deposit, for example. In addition, these or like provisional credit services may not be capable of providing instant credit for cash deposited into their remote depositing systems, such as smart safes, for example. As such, customers of current provisional credit services may be forced to wait for a certain time period, such as typically between twenty-four to ninety-six hours, for example, to receive credit for deposited cash. This may also prevent customers from earning interest within such a time period, from accessing and/or using cash with a variety of services, such as on-line banking, for example, or the like. In addition, current provisional credit services may charge a fee for deposit-related receipts and/or reports, which may be included on top of an overall monthly fee, for example. Greater flexibility for businesses and/or individuals with respect to accessing cash deposited into cash capture depositing systems, such as remote bill-validating smart safes, for example, may, therefore, be desirable.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
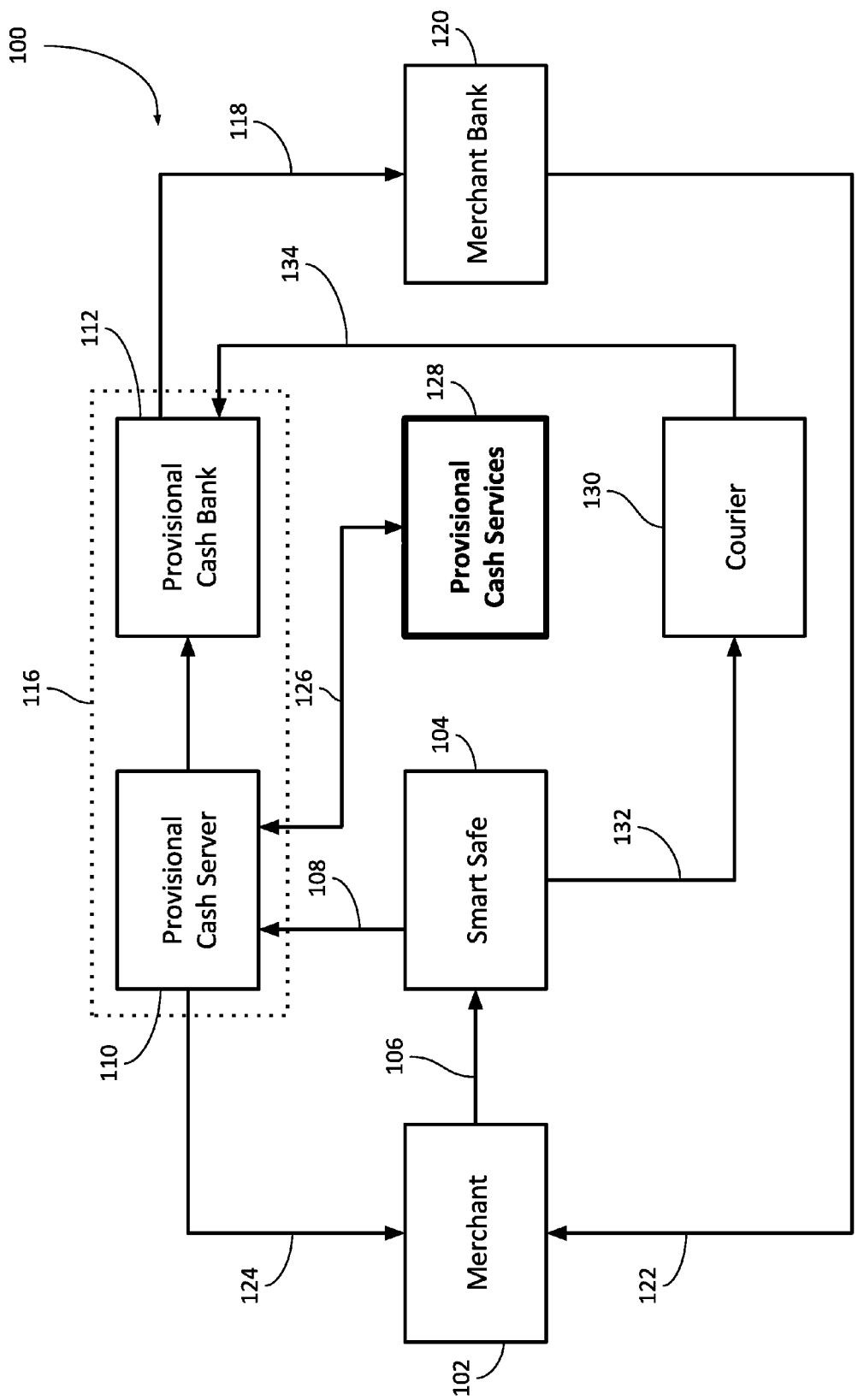
FIG. 1 is a schematic diagram illustrating features associated with an implementation of an example use case or scenario for instant bank account crediting using a remote bill-validating depositing system.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for instant bank account crediting via a bill-validating depositing system, such as a smart safe, for example. As was indicated, these or like operations and/or techniques may, for example, be implemented, in whole or in part, in connection with one or more provisional credit deposit services, such as via one or more computing and/or communication networks and/or protocols (e.g., network protocols) discussed herein. In this context, "bill-validating smart safe" or simply "smart safe" refers to one or more currency depositing and/or withdrawing systems and/or devices capable of capturing, validating, counting, and/or withdrawing cash or currency, such as banknotes and/or coins of various denominations, for example, for purposes of a deposit and/or withdrawal, bank-related or otherwise, and/or one or more other credit-related transactions. In some instances, a smart safe may be located remotely from a bank or like financial entity. For example, in at least one implementation, a smart safe may be located at a business or merchant's location (e.g., in a lobby, vault, safe room, behind the counter, etc.). At times, a smart safe may, for example, comprise or be in the form of an automated teller machine (ATM), envelope-free or otherwise. Claimed subject matter is not so limited, of course. The terms "provisional credit deposit service," "provisional credit service," "provisional cash service," or the like may be used interchangeably herein.

As alluded to previously, one or more operations and/or techniques discussed herein may, for example, be used, in whole or in part, to provide instant bank credit into an account for cash deposited into a bill-validating smart safe, which may provide advantages. For example, in some instances, an amount of money equal to cash deposited into a smart safe may be instantly available for withdrawal at one or more locations, such as in real time or near real time, as will also be seen. In this context, "real time" refers to an amount of timeliness of on-line transactions, deposit-related or otherwise, which may have been delayed by, for example, an amount of time attributable to electronic communication and/or signal processing. By way of example but not limitation, cash deposited into a smart safe in San Francisco at 1:30 PT may, for example, be withdrawn the same day from an automated teller machine (ATM) in New York at 4:31 AT, such as right after the deposit occurred, for example. Again, claimed subject matter is not limited to this particular withdrawal, of course. As used herein, "on-line" refers to a type of a communication that may be implemented electronically, such as via one or more suitable communications networks (e.g., wireless, wired, etc.), for example.

As was also indicated, current provisional credit services, such as remote cash capture services utilizing off-site bill-validating smart safes, for example, may typically provide provisional credit deposits once a day, such as between twenty-four to ninety six hours after cash has been deposited into a particular smart safe, as one particular example. In some instances, these lengthy time delays between deposits and actualization of cash deposited may not be desirable (e.g., too long, etc.) or useful for many businesses and/or individuals. At times, these or like provisional credit services may also involve a third-party service, such as to affect a deposit, for example, which may increase costs, and also may not be capable of providing instant credit for cash deposited into their smart safes. In particular, current provisional credit services may typically give credit for cash deposited into a smart safe once per day, for example, and on business days, meaning that on weekends and/or holidays cash deposits are typically credited the next business day, which may be any number of days. As was mentioned previously, this delay may not be desirable for customers, may prevent customers from earning interest on deposited cash, may prevent customers from paying invoices with on-line bill paying, or the like. Accordingly, it may be desirable to develop one or more methods, systems, and/or apparatuses that may facilitate and/or support providing instant deposit credits, such as in real or near real time, for example, every day of the year, including weekends and/or holidays, directly into a bank account of interest for cash deposited into a remote bill-validating depositing system, such as a smart safe.

Referring now to FIG. 1, which is a schematic diagram illustrating features associated with an implementation of an example use case or scenario of an operating environment 100 that may be used, in whole or in part, to facilitate and/or support one or more operations and/or techniques for instant bank account crediting via a bill-validating depositing system, such as a smart safe, for example. These one or more operations and/or techniques may, for example, be implemented, in whole or in part, via one or more computing and/or communication networks, such as one or more wireless networks, wired networks, or any combination thereof, as will be discussed in greater detail below. It should also be noted that, even though a certain number of particular entities, systems, features, etc. are illustrated, any number of suitable entities, systems, features, etc. may be implemented herein. It should also be understood that there may be one or more equivalent entities, systems, features, etc. that may be substituted herein, such as without deviating from the scope of claimed subject matter. Also, depending on an implementation, a single-sided arrow and/or a double-sided arrow may, for example, indicate a unidirectional flow, a bi-directional flow, or any combination thereof, such as with respect to transactions, signals, operations, processes, communications, and/or the like that may comprise and/or be represented via one or more digital signals. The terms "communications," "electronic communications," and/or similar terms (e.g. "communicate," etc.) may be used interchangeable herein. These or like communications may or may not be encoded, such as for security purposes.

Thus, according to an implementation, a merchant or like entity, referenced at 102, may, for example, access a smart safe 104 that may be located at a merchant's location, as one possible example, and may deposit cash of a suitable amount, such as by feeding cash (e.g., banknotes, coins, etc.) into smart safe's acceptor and/or validator. Here, any suitable smart safe capable of capturing and/or validating cash by denomination, generating totals, rejecting counterfeit bills, etc. as well as communicating with a host or server computing device, such as via one or more client-server-type communications, for example, may be utilized. Server-client communications will be discussed in further detail below. Although claimed subject matter is not limited in scope in this respect, a few potential examples of smart safes may include those available from Tidel of Carrollton, Tex., from Armor Safe Technologies of The Colony, Tex., from Triton Systems of Long Beach, Miss., from Fire King Security Group of New Albany, Ind., from American Security Products of Fontana, Calif., or the like. Another example of a smart safe may include, for example, an envelope-free depositing ATM, as was indicated.

In this context, "merchant," "business," or like terms refer to an entity and/or entity's representative, such as an individual, for example, involved in and/or associated with a provision of goods and/or services. At times, prior to such a deposit, merchant 102 may, for example, be authenticated in some manner, such as prompted to verify its identity, such as by one or more applicable features of a smart safe, for example, so as to ensure that merchant 102 is a legitimate depositor. For example, merchant 102 may be prompted to enter one or more of its credentials into an appropriate input feature and/or device (e.g., a touch screen, key pad, etc.) of smart safe 104. To illustrate, merchant 102 may, for example, be prompted to input or enter a username, account number, registration number, or the like. In some instances, merchant 102 may, for example, be prompted to input a security number, such as a personal identification number (PIN), or like password, numeric or otherwise. Optionally or alternatively, merchant 102 may, for example, use a plastic card embedded with a storage medium, such as a barcode, magnetic strip, computer chip, or the like, if applicable, that may be issued by an appropriate financial entity, service, etc. for authentication, transaction verification, inputting applicable information, etc., such as via an embedded chip (e.g., by inserting into a reader, etc.), magnetic strip (e.g., by swiping, etc.), or the like. Of course, these are merely examples related to authentication and claimed subject matter is not so limited.

As illustrated at 106, in an implementation, having been verified as a legitimate depositor, merchant 102 may deposit cash, such as, for example, by feeding one or more bills into a smart safe's bill acceptor and/or validator in any suitable fashion. Upon completion, merchant 102 may, for example, signify or confirm that a deposit is complete via an appropriate user input, such as touching or pressing an on-screen or physical button, entering an applicable command and/or text, or the like, just to illustrate a few possible implementations. It should be noted that a smart safe may be capable of accepting, validating, and/or depositing funds, such as discussed herein, into more than one financial entity, such as a bank, for example, and/or more than one bank account, such as in a checking, sweep, credit card, savings, etc. account, or the like. It should also be noted that merchant 102 may, for example, be capable of withdrawing cash from smart safe 104, implement credit or like card payment, etc. In such a case, one or more operations and/or techniques discussed herein may also be utilized, in whole or in part, such as in a similar or like fashion and/or without deviating from the scope of claimed subject matter. For example, withdrawal-related content may be communicated to merchant 102, associated bank, etc., such as acknowledgement, bank statement, etc., as a few possible examples, immediately upon withdrawal, such as using one or more operations and/or processes discussed herein, in whole or in part.

Continuing with the above discussion, having made a deposit, merchant 102 may, for example, request a receipt and/or report, such as via an appropriate input using an applicable interface of smart safe 104. A receipt and/or report may comprise any suitable deposit-related content, such as, for example, merchant's name, account, etc., date, time, place, etc. of a deposit, deposit amount by denomination, smart safe identifier, or the like, or any combination thereof. A receipt and/or report may, for example, be furnished, such as provided and/or communicated to merchant 102 via any suitable approaches, such as printed via a printer associated with smart safe 104, wirelessly transmitted to a merchant's handheld device (e.g., smart phone, tablet computing device, etc.), or the like.

As was indicated, at 108, smart safe 104 may instantly communicate deposit-related content, such as indicated above, for example, to a suitable server on a network, illustrated herein as a provisional cash server 110 associated with a provisional credit deposit or like service, such as a provisional cash bank 112, just to illustrate one possible implementation. As was discussed, an instant communication, 108 or otherwise, may comprise a communication in real time or near real time. In turn, as referenced at 114, provisional cash server 110 may, for example, communicate deposit-related information to provisional cash bank 112. In some instances, communication 114 may be also implemented instantly, such as in real time or near real time, for example, via one or more digital signals (e.g., signal packets, etc.) comprising one or ore electronic files or documents. It should be noted that even though provisional cash sever 110 and provisional cash bank 112 are illustrated as a single entity, as referenced generally via a dashed line at 116, in some instances, provisional cash sever 110 and provisional cash bank 112 may comprise separate entities.

As illustrated at 118, provisional cash server 110 and/or provisional cash bank 112 may, for example, immediately communicate suitable deposit-related information to an appropriate bank account in a merchant bank 120 or like merchant-related financial entity. As referenced at 122, merchant bank 120 may instantly communicate with merchant 102, such as via an appropriate acknowledgement, for example, so as to credit a bank account, such as checking, savings, etc. of merchant 102 for the amount of the deposit. This may, for example, give merchant 102 immediate access to the funds for cashing checks, online bill paying, physically withdrawing cash at a branch of merchant bank 120 (e.g., via an ATM, etc.) or any other suitable entity, nationally and/or worldwide, if applicable. In addition, in some instances, such as if cash is deposited into a savings account, for example, merchant 102 may begin to earn applicable interest immediately. Merchant 102 may, for example, be capable of depositing cash into a smart safe twenty-four hours a day, three hundred and sixty five days a year, on a weekends, holidays, etc. and may receive immediate deposit credit, start earning interest on deposited cash, etc.

In at least one implementation, as referenced at 124, deposit-related content may be communicated to merchant 102 by provisional cash server 110 and/or provisional cash bank 112, such as acknowledgement, for example, immediately upon receipt of communication 108, as one possible example. Such deposit-related content may, for example, be communicated via an applicable communications network and/or in connection with a suitable software application that may be provided to merchant 102 via any suitable push and/or pull technology, just to illustrate a few possible implementations. For example, an application may be made available by and/or downloaded from provisional cash server 110, as one possible example, or any other suitable server, and/or may be stored locally on any suitable computing device of merchant 102 capable of communicating with provisional cash server 110 and/or provisional cash bank 112 via one or more communication networks and/or protocols. In some instances, deposit-related content may also be rendered by such an application, which may reside on a computing device of merchant 102, for example. At times, deposit-related content may, for example, be rendered by a network browser residing on a computing device of merchant 102 that receives information from provisional cash server 110 and/or other network server. Claimed subject matter is not limited to a particular implementation, of course. As such, merchant 102 may, for example, be capable of receiving and/or viewing timely updates, such as up-to-the-second reports, as one possible example, for deposit-related activities, transactions, cash balances, or the like. As illustrated at 126, deposit-related content may also be immediately communicated to provisional cash services 128, such as to be reconciled and/or balanced with a provisional credit given to merchant 102. As also seen, provisional cash services 128 may be in communication with any suitable entity associated with operating environment 100, such as provisional cash server 110 and/or provisional cash bank 112, just to name a few examples.

Thus, merchant 102 may, for example, be capable of making cash deposits, such as discussed above, throughout the day for a number of days, which may accumulate at smart safe 104. As such, in at least one implementation, an armored car or like service may, for example, be employed, in whole or in part, to periodically (e.g., biweekly, monthly, etc.) dispatch a courier 130 to visit a location of smart safe 104. Here, courier 130 may, for example, physically withdraw deposited cash, as illustrated at 132, such as via a deposit cassette or like feature of smart safe 104. Deposit cassettes are generally known and need not be described here in greater detail. In some instances, upon withdrawal, a report may, for example, be generated detailing the amount of cash in a deposit cassette of smart safe 104, such as by denomination totals, cash totals, with time, date, location, etc. of withdrawal by courier 130, courier's 130 and/or armored car service's ID or like number, or the like, or any combination thereof. Such a report may, for example, be printed and/or communicated to merchant 102 via one or more appropriate networks and/or communications, such via communication 124, as one possible example. At times, such a report may, for example, comprise or be part of a deposit slip, bank statement, account statement, or like financial document. Claimed subject matter is not so limited, of course. For example, as was indicated, courier 130 may also deposit cash into smart safe 104, such as for purposes of withdrawal by merchant 102, or like processes.

For purposes of explanation, typically, an armored car service may not be capable of accessing cash in a deposit cassette, if present. For example, in some instances, no one may have access to cash in a deposit cassette other than courier 130, such as to facilitate and/or support privacy theft, for the purposes of tracking, or the like. As further illustrated at 134, having withdrawn cash and/or deposit cassette, courier 130 may, for example, physically transport cash and/or cassette to provisional cash bank 112 or any other suitable cash depository, such as a virtual vault, pseudo branch set up with an armored car service, etc. for reconciliation and/or balancing with a provisional credit given to merchant 102, as was indicated. It should be noted that, in some instances, a bank, such as provisional cash bank 112, for example, may or may not charge a daily interest rate and/or fee for a credit that merchant 102 has received. At times, a bank, such as provisional cash bank 112, for example, may bundle such an interest and/or fee with other service fees.

Thus, one or more operations and/or techniques for instant bank account crediting via a bill-validating depositing system, such as a smart safe, for example, may be implemented using a hardware, such as one or more computing platforms and/or devices discussed herein, and/or software, or any combination thereof. For example, in some instances, with regard to receiving provisional credit for deposits, among other things, a smart safe, a provisional cash server, a provisional cash bank or like infrastructure, and/or a merchant's bank or like infrastructure may be utilized, in whole or in part. At times, for physically collecting cash deposited into a smart safe to a bank or other depository (e.g., a virtual vault, etc.), among other things, such as for balancing, reconciling, etc. an armored car or like service may, for example, be employed, in whole or in part. Also, in some instances, hardware and/or software may, for example, include a capability for a smart safe to communicate one or more applicable electronic files, such as soon as cash has been deposited. As was indicated, a file may comprise any suitable content in electronic form, such as, for example, an identity, location, etc. of a smart safe, time, date, amount, etc. of a cash deposit and/or withdrawal, bank routing and/or account number, or the like, or any combination thereof.

At times, hardware and/or software may also include a capability for a suitable server, such as a provisional cash server, for example, to receive deposit-related content and/or other applicable communications from a smart safe or any other appropriate device, such as via one or more communications and/or communication networks discussed herein, and transmitting deposit-related content to a suitable bank for credit, such as in real or near real time. In some instances, hardware and/or software may also include a capability for a suitable server, such as a provisional cash server, for example, to provide and/or make available deposit-related content to a merchant or other party of interest, such as a merchant's bank, provisional cash services, or the like. These or like features and/or capabilities may, for example, depend on a particular implementation, merchant, bank, smart safe, communications network, services, or the like.

Figure 2:
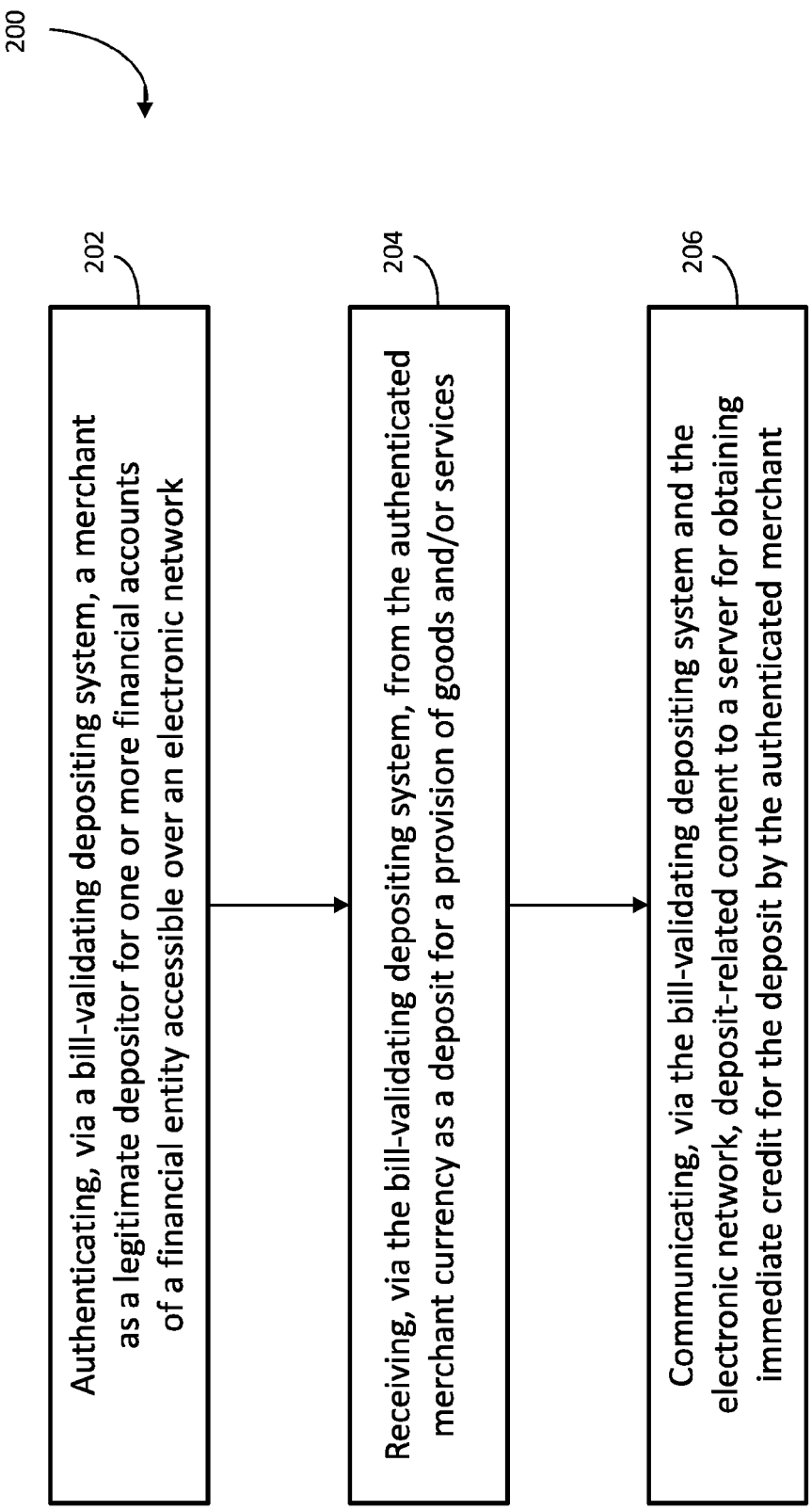
FIG. 2 is a flow diagram illustrating an implementation of an example process for instant bank account crediting using a remote bill-validating depositing system.

FIG. 2 is a flow diagram illustrating an implementation of an example process 200 that may be performed, in whole or in part, to facilitate and/or support one or more operations and/or techniques for instant bank account crediting via a bill-validating depositing system, such as smart safe 104 of FIG. 1, for example. It should be noted that content acquired and/or produced, such as, for example, input signals, output signals, operations, results, etc. associated with example process 200 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Example process 200 may, for example, begin at operation 202 with authenticating, via a bill-validating depositing system, a merchant as a legitimate depositor for one or more financial accounts of a financial entity accessible over an electronic network. As was indicated, a bill-validating depositing system may comprise, for example, a smart safe. In some instances, a smart safe may be located remotely from such a financial entity, such as at a merchant's location (e.g., in a lobby, vault, safe room, etc.). Here, a merchant may, for example, be authenticated, at least in part, via entering or inputting one or more applicable credentials (e.g., a username, account number, registration number, security number, password, etc.) into an input feature and/or device associated with a smart safe. A merchant may, for example, be authenticated for one financial entity and/or account (e.g., a checking account in a bank, etc.) or more than one financial entity and/or account (e.g., checking, savings, credit, etc. accounts in a bank or banks, etc.) of a financial entity, such as a bank, service, or the like. An electronic network may comprise any suitable network, such as, for example, a wireless network, a wired network, or any combination thereof.

With regard to operation 204, currency may, for example, be received, via the bill-validating depositing system, from the authenticated merchant as a deposit for a provision of goods and/or services. In this context, "currency" or "cash" refers to money in any suitable form, which may or may not be in circulation. For example, currency may comprise one or more banknotes and/or coins of various denominations currently in use, though claimed subject matter is not so limited. Any suitable currency equivalents, such as current assets, for example, may be utilized herein, in whole or in part. Thus, a merchant may, for example, deposit currency of a suitable amount by feeding such currency into smart safe's acceptor and/or validator. Upon completion, a receipt and/or report for a deposit may, for example, be generated, such as to be furnished to an authenticated merchant via one or more applicable approaches, as discussed above. For example, in some instances, such a receipt and/or report may be furnished to an authenticated merchant in real time or near real time.

At operation 206, deposit-related content may, for example, be communicated, via the bill-validating depositing system and the electronic network, to a server for obtaining immediate credit for the deposit by the authenticated merchant. As was also discussed, deposit-related content may, for example, communicated to a suitable server, such as a provisional cash server, as one example, for receiving an immediate acknowledgement from a financial entity indicating that credit has been given to an authenticated merchant. In some instances, such credit may comprise, for example, provisional credit to be reconciled and/or balanced with the deposit. An immediate acknowledgement may be in any suitable form, such as, for example, an electronic message, physical statement, or the like, or any combination thereof. Immediate credit may, for example, allow an authenticated merchant to immediately access one or more financial instruments that may be equal in value to such a deposit. For example, one or more financial instruments comprise currency available via an automated teller machine (ATM), electronic funds available via one or more financial accounts, credit available from a financial entity, or the like, or any combination thereof. In at least one implementation, example process 200 may, for example, be implemented in connection with an armored car service employing a courier for physically transporting currency to financial entity. For example, a courier may physically transport deposited currency to a bank, virtual vault, pseudo branch, or the like, such as for reconciliation and/or balancing with a credit given to a merchant, as was also indicated.

Accordingly, as discussed herein, one or more operations and/or techniques for instant bank account crediting via a bill-validating depositing system, such as a smart safe, for example, may provide benefits. For example, as was indicated, a merchant may be capable of accessing cash deposited into a smart safe more quickly, such as seconds after a deposit occurred, as one possible example. In addition, deposits and/or related credits may, for example, be available twenty-four hours a day, three hundred and sixty five days a year, on a weekends, holidays, etc. Further, cash deposited into a bank savings account, for example, may begin earning interest immediately, such as instead of waiting a certain time period, as was also discussed, and/or provisional cash banks may also be able to collect revenue, such as in the form if an interest, for example, immediately (e.g., instead of waiting twenty-four to ninety six hours, etc.).

Also, expenses attributable to an additional and/or intermediate provisional cash processing service, such as a third party processing deposit transactions, for example, may be eliminated or otherwise reduced. In some instances, one or more operations and/or techniques for instant bank account crediting via a bill-validating depositing system, such as a smart safe, for example, may also improve upon existing provisional credit-related communications and/or systems, such as while decreasing associated costs, increasing systems' usability and/or efficiency, or the like. Of course, such a description of certain aspects of instant bank account crediting using a remote bill-validating depositing system, such as a smart safe, for example, and its benefits is merely an example, and claimed subject matter is not so limited.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term "network device" refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term "electronic file" and/or the term "electronic document" or the like are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

As was indicated, in the context of the present disclosure, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or ore embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, 051 Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 3:
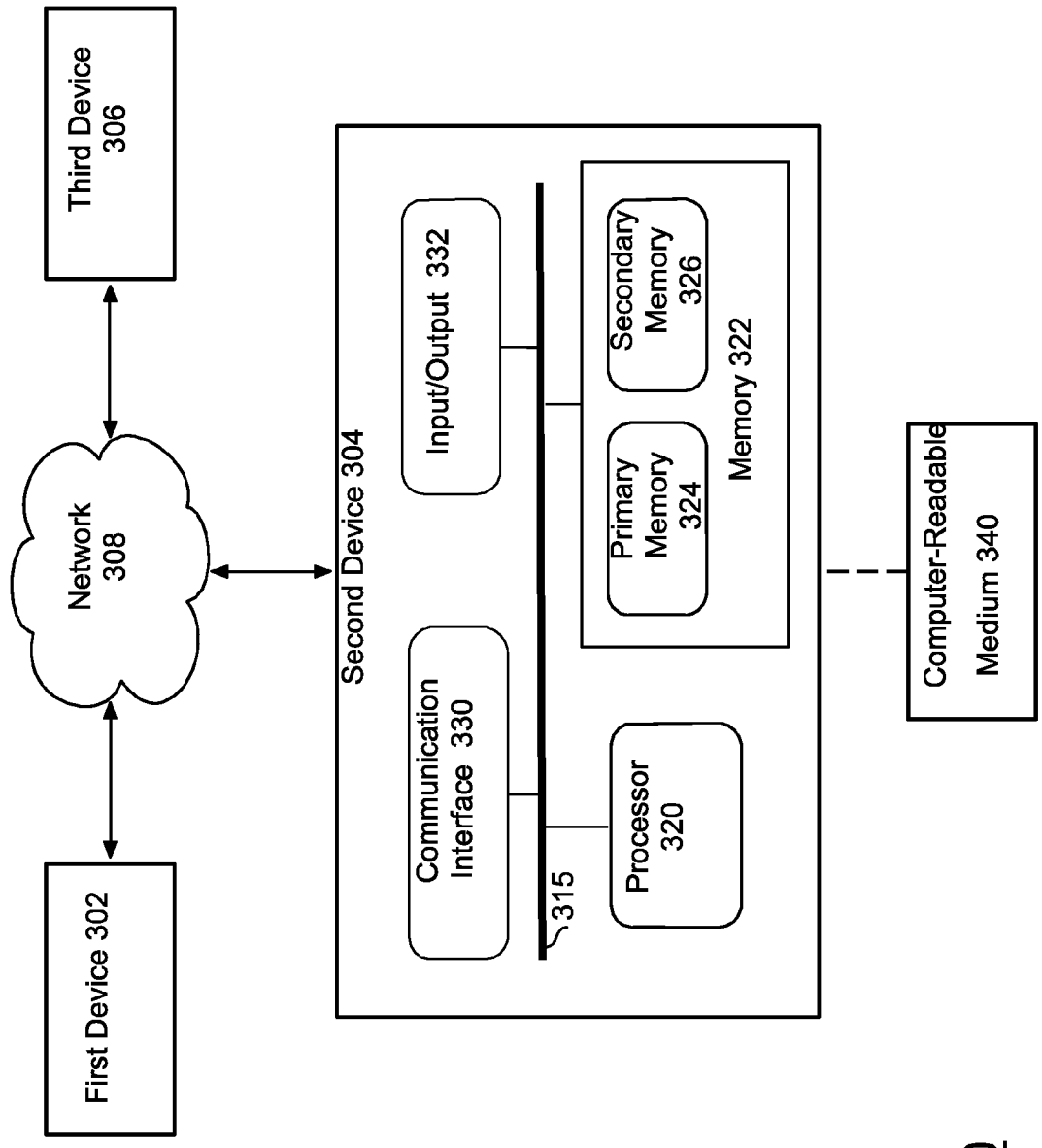
FIG. 3 is a schematic diagram illustrating an implementation of a computing device that may be employed in a client-server type interaction.

In one example embodiment, as shown in FIG. 3, a system embodiment may comprise a local network (e.g., a second device 304 and a computer-readable medium 340) and/or another type of network, such as a computing and/or communications network. For purposes of illustration, therefore, FIG. 3 shows an embodiment 300 of a system that may be employed to implement either type or both types of networks. Network 308 may comprise one or more network connections, links, processes, services, applications, and/or resources to facilitate and/or support communications, such as an exchange of communication signals, for example, between a computing device, such as 302, and another computing device, such as 306, which may, for example, comprise one or more client computing devices and/or one or more server computing device. By way of example, but not limitation, network 308 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 3 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 §USC 112 (f) so that it is specifically intended that 35 §USC 112 (f) not be implicated by use of the term "computing device" and/or similar terms; however, if it is determined, for some reason not immediately apparent, that the foregoing understanding cannot stand and that 35 §USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-2 of the present disclosure.

Referring now to FIG. 3, in an embodiment, first and third devices 302 and 306 may be capable of rendering a graphical user interface (GUI) for a network device and/or a computing device, for example, so that a user-operator may engage in system use. Device 304 may potentially serve a similar function in this illustration. Likewise, in FIG. 3, computing device 302 ('first device' in figure) may interface with computing device 304 (second device' in figure), which may, for example, also comprise features of a client computing device and/or a server computing device, in an embodiment. Processor (e.g., processing device) 320 and memory 322, which may comprise primary memory 324 and secondary memory 326, may communicate by way of a communication bus 315, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 304, as depicted in FIG. 3, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (Wi-MAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or ore protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 3, computing device 302 may provide one or more sources of executable computer instructions in the form physical states and/or signals (e.g., stored in memory states), for example. Computing device 302 may communicate with computing device 304 by way of a network connection, such as via network 308, for example. As previously mentioned, a connection, while physical, may not necessarily be tangible. Although computing device 304 of FIG. 3 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 322 may comprise any non-transitory storage mechanism. Memory 322 may comprise, for example, primary memory 324 and secondary memory 326, additional memory circuit mechanisms, or combinations thereof may be used. Memory 322 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 322 may be utilized to store a program of executable computer instructions. For example, processor 320 may fetch executable instructions from memory and proceed to execute the fetched instructions. Memory 322 may also comprise a memory controller for accessing device readable-medium 340 that may carry and/or make accessible digital content, which may include code, and/or instructions, for example, executable by processor 320 and/or some other device, such as a controller, as one example, capable of executing computer instructions, for example. Under direction of processor 320, a non-transitory memory, such as memory cells storing physical states (e.g., memory states), comprising, for example, a program of executable computer instructions, may be executed by processor 320 and able to generate signals to be communicated via a network, for example, as previously described. Generated signals may also be stored in memory, also previously suggested.

Memory 322 may store electronic files and/or electronic documents, such as relating to one or more users, and may also comprise a device-readable medium that may carry and/or make accessible content, including code and/or instructions, for example, executable by processor 320 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 3, processor 320 may comprise one or more circuits, such as digital circuits, to perform at least a portion of a computing procedure and/or process. By way of example, but not limitation, processor 320 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 320 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 3 also illustrates device 304 as including a component 332 operable with input/output devices, for example, so that signals and/or states may be appropriately communicated between devices, such as device 304 and an input device and/or device 304 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method of executing computer instructions on at least one computing device in which the at least one computing device includes at least one processor and at least one memory, comprising:

fetching computer instructions from the at least one memory of the at least one computing device for execution on the at least one processor of the at least one computing device;

executing the fetched computer instructions on the at least one processor of the at least one computing device; and storing in the at least one memory of the at least one computing device any results of having executed the fetched computer instructions on the at least one processor of the at least one computing device;

wherein the computer instructions to be executed comprise instructions for instant bank account crediting via a bill-validating depositing system;

wherein the executing the fetched computer instructions further comprises:

authenticating, via the bill-validating depositing system, a merchant as a legitimate depositor for one or more financial accounts of a financial entity accessible over an electronic network;

receiving, via the bill-validating depositing system, from the authenticated merchant currency as a deposit for a provision of goods and/or services; and communicating, via the bill-validating depositing system and the electronic network, deposit-related content to a server for obtaining immediate credit for the deposit by the authenticated merchant to allow the authenticated merchant to immediately access one or more financial instruments equal in value to the deposit, wherein the deposit-related content is communicated via the electronic network to a server for receiving an immediate acknowledgement from the financial entity indicating that the credit has been given to the authenticated merchant; and wherein the storing in the at least one memory of the at least one computing device any results of having executed the fetched computer instructions on the at least one processor of the at least one computing device comprises: storing immediate credit details in the at least one memory of the at least one computing device, the immediate credit details resulting from the execution of the fetched computer instructions on the at least one processor of the at least one computing device.

2. The method of claim 1, wherein the server comprises a provisional cash server associated with a provisional cash bank.

3. The method of claim 1, wherein the one or more financial instruments comprise at least one of the following: the currency available via an automated teller machine (ATM); electronic funds available via the one or more financial accounts; credit available from the financial entity; or any combination thereof.

4. The method of claim 1, wherein the financial entity comprises at least one of the following: a bank of the authenticated merchant; a provisional cash bank; a provisional cash service; a virtual vault; a pseudo branch; or any combination thereof.

5. The method of claim 1, wherein the bill-validating depositing system is located remotely from the financial entity.

6. The method of claim 1, wherein the one or more financial accounts comprise at least one of the following: a checking account; a savings account; a credit account; a sweep account; or any combination thereof.

7. The method of claim 1, wherein the bill-validating depositing system comprises a smart safe.

8. The method of claim 1, wherein the deposit-related content is communicated in real time or near real time.

9. The method of claim 1, wherein the executing the fetched computer instructions further comprises generating a receipt and/or report for the deposit to be furnished to the authenticated merchant.

10. The method of claim 9, wherein the receipt and/or report is furnished to the authenticated merchant in real time or near real time.

11. The method of claim 1, wherein the credit comprises provisional credit to be reconciled and/or balanced with the deposit.

12. The method of claim 1, wherein the method of executing the computer instructions is implemented in connection with an armored car service employing a courier for physically transporting the currency to the financial entity.

13. The method of claim 1, wherein the electronic network comprises at least one of the following: a wireless network; a wired network; or any combination thereof.

14. An apparatus comprising:
at least one computing device, the at least one computing device including at least one processor and at least one memory;
the at least one computing device to execute computer instructions on the at least one processor, the computer instructions to be executed having been fetched from the at least one memory for execution on the at least one processor and the at least one computing device to store in the at least one memory of the at least one computing device any results to be generated from the execution on the at least one processor of the to be executed computer instructions;
wherein the computer instructions to be executed to comprise instructions to receive an immediate credit via a bill-validating depositing system;
wherein the instructions to be executed as a result of the execution to:
authenticate, via the bill-validating depositing system, a merchant as a legitimate depositor for one or more financial accounts of a financial entity to be accessible over an electronic network;
receive, via the bill-validating depositing system, from the authenticated merchant currency as a deposit for a provision of goods and/or services; and
communicate, via the bill-validating depositing system and the electronic network, deposit-related content to a server to obtain the immediate credit for the deposit by the authenticated merchant to allow the authenticated merchant to immediately access one or more financial instruments to be equal in value to the deposit, wherein the deposit-related content is to be communicated via the electronic network to a server for a receipt of an immediate acknowledgement from the financial entity to indicate that the credit has been given to the authenticated merchant.

15. An article comprising:
a non-transitory computing storage medium having stored thereon instructions executable by at least one computing device, the at least one computing device comprising at least one processor and at least one memory to:
execute computer instructions on the at least one processor, the computer instructions to be executed having been fetched from the at least one memory for execution on the at least one processor and the at least one computing device to store in the at least one memory of the at least one computing device any results to be generated from the execution on the at least one processor of the to be executed computer instructions;
wherein the computer instructions to be executed to comprise instructions to receive an immediate credit via a bill-validating depositing system;
wherein the instructions to be executed as a result of the execution to:
authenticate, via the bill-validating depositing system, a merchant as a legitimate depositor for one or more financial accounts of a financial entity to be accessible over an electronic network;
receive, via the bill-validating depositing system, from the authenticated merchant currency as a deposit for a provision of goods and/or services; and
communicate, via the bill-validating depositing system and the electronic network, deposit-related content to a server to obtain the immediate credit for the deposit by the authenticated merchant, wherein the immediate credit is to allow the authenticated merchant to immediately access one or more financial instruments to be equal in value to the deposit.

* * * * *